(12) United States Patent
Peng

(10) Patent No.: US 9,648,708 B1
(45) Date of Patent: May 9, 2017

(54) LIGHT SENSING SEQUENCE RECORDING APPARATUS AND SMART LIGHT EMITTING DIODE LIGHTING SYSTEM

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 15/205,541

(22) Filed: Jul. 8, 2016

(51) Int. Cl.
| | |
|---|---|
| *H05B 39/04* | (2006.01) |
| *H05B 37/02* | (2006.01) |
| *H05B 33/08* | (2006.01) |
| *F21V 23/02* | (2006.01) |
| *F21V 23/00* | (2015.01) |
| *F21Y 115/10* | (2016.01) |

(52) U.S. Cl.
CPC ......... *H05B 37/029* (2013.01); *F21V 23/003* (2013.01); *F21V 23/02* (2013.01); *H05B 33/0842* (2013.01); *H05B 37/0227* (2013.01); *F21Y 2115/10* (2016.08)

(58) Field of Classification Search
CPC .............. H05B 37/029; H05B 33/0803; H05B 37/0254; H05B 37/02; H05B 33/0818
USPC ...................... 315/312, 185 R, 291, 307, 308
See application file for complete search history.

(56) References Cited

U.S. PATENT DOCUMENTS 8,334,898 B1 * 12/2012 Ryan .................... G01C 21/206
348/61

* cited by examiner

*Primary Examiner* — Mind D A
(74) *Attorney, Agent, or Firm* — Muncy, Geissler, Olds & Lowe, P.C.

(57) ABSTRACT

A light sensing sequence recording apparatus includes a plurality of light sensing components and a light sensing sequence recording unit. The light sensing sequence recording unit is electrically connected to the light sensing components. Each of the light sensing components sends a light sensing signal to the light sensing sequence recording unit respectively at different times. The light sensing sequence recording unit records a light sensing sequence that the light sensing sequence recording unit receives the light sensing signals sent by each of the light sensing components respectively.

10 Claims, 4 Drawing Sheets

LIGHT SENSING SEQUENCE RECORDING APPARATUS AND SMART LIGHT EMITTING DIODE LIGHTING SYSTEM

BACKGROUND OF THE INVENTION

Field of the Invention

The present invention relates to a recording apparatus and a light emitting diode lighting system, and especially relates to a light sensing sequence recording apparatus and a smart light emitting diode lighting system.

Description of the Related Art

There are a lot of types of the related art light emitting diode lighting systems. The light emitting diode units of one of the related art light emitting diode lighting systems comprise address codes. The related art lighting signal controller sends a plurality of lighting signals to a plurality of the light emitting diode units sequentially. Each of the lighting signals comprises a specific address code. Each of the light emitting diode units comprises an address code. If the address code of the light emitting diode unit is the same with (namely, matches with) the specific address code of the lighting signal, the light emitting diode unit will be driven by the lighting signal.

When the light emitting diode lighting system mentioned above is manufactured, operators have to be careful to arrange the light emitting diode units according to the sequence of the address codes. For example, the light emitting diode unit having address code 01 has to be arranged at the first location of the light emitting diode units. The light emitting diode unit having address code 02 has to be arranged at the second location of the light emitting diode units, and so on. Therefore, when the user designs the lighting command which comprises a plurality of the lighting signals, the light emitting diode units can be sequentially and correctly driven to light according to the user's idea.

For example, if the user wants that the lighting sequence is: the fifth, fourth, third, second and first location of the light emitting diode units are driven to light sequentially, the lighting command will be designed by the user intuitively as: the lighting signal having the specific address code 05, 04, 03, 02 and 01 are sent out sequentially to drive the light emitting diode units having the address code 05, 04, 03, 02 and 01 sequentially.

If the light emitting diode units are not arranged according to the sequence of the address codes, for example, the light emitting diode unit having the address code 01 is arranged incorrectly at the second location of the light emitting diode units, and the light emitting diode unit having the address code 02 is arranged incorrectly at the first location of the light emitting diode units, when the lighting command (as mentioned above) is designed as: the lighting signal having the specific address code 05, 04, 03, 02 and 01 are sent out sequentially, the fifth, fourth, third, first and second location of the light emitting diode units are driven to light sequentially, which is different from the user's idea, wherein the user's idea is: the fifth, fourth, third, second and first location of the light emitting diode units are driven to light sequentially.

Therefore, arranging the light emitting diode units according to the sequence of the address codes is very important, so that the sequence of arranging the light emitting diode units having the address codes cannot have any mistake.

SUMMARY OF THE INVENTION

In order to solve the above-mentioned problems, an object of the present invention is to provide a light sensing sequence recording apparatus.

In order to solve the above-mentioned problems, another object of the present invention is to provide a smart light emitting diode lighting system.

In order to achieve the object of the present invention mentioned above, the light sensing sequence recording apparatus comprises a plurality of light sensing components and a light sensing sequence recording unit. The light sensing sequence recording unit is electrically connected to the light sensing components. Each of the light sensing components sends a light sensing signal to the light sensing sequence recording unit respectively at different times. The light sensing sequence recording unit records a light sensing sequence that the light sensing sequence recording unit receives the light sensing signals sent by each of the light sensing components respectively.

In order to achieve the object of the present invention mentioned above, the smart light emitting diode lighting system comprises a light sensing sequence recording apparatus and a light emitting diode lighting apparatus. The light emitting diode lighting apparatus is electrically connected to the light sensing sequence recording apparatus. The light sensing sequence recording apparatus comprises a plurality of light sensing components and a light sensing sequence recording unit. The light sensing sequence recording unit is electrically connected to the light sensing components. The light emitting diode lighting apparatus comprises a lighting signal controller and a plurality of light emitting diode units. The lighting signal controller is electrically connected to the light sensing sequence recording unit. The light emitting diode units are electrically connected to the lighting signal controller. The lighting signal controller sends a plurality of lighting signals to the light emitting diode units sequentially at different times. If an address code of the light emitting diode unit is the same with (namely, matches with) a specific address code of the lighting signal, the light emitting diode unit is driven by the lighting signal to light, so that the light sensing component facing the light emitting diode unit senses light emitted by the light emitting diode unit and sends a light sensing signal to the light sensing sequence recording unit. The light sensing sequence recording unit records a light sensing sequence that the light sensing sequence recording unit receives the light sensing signals sent by each of the light sensing components respectively, and then the light sensing sequence recording unit informs the lighting signal controller of the light sensing sequence. By looking up (namely, comparing to, checking with or identifying with) the light sensing sequence, the lighting signal controller adjusts a lighting sequence of a lighting command sent to the light emitting diode units.

The advantage of the present invention is to simplify the manufacturing process of the sequence of arranging the light emitting diode units (of the light emitting diode lighting system) having the address codes.

DETAILED DESCRIPTION OF THE INVENTION

Please refer to following detailed description and figures for the technical content of the present invention. The following detailed description and figures are referred for the present invention, but the present invention is not limited to it.

Figure 1:
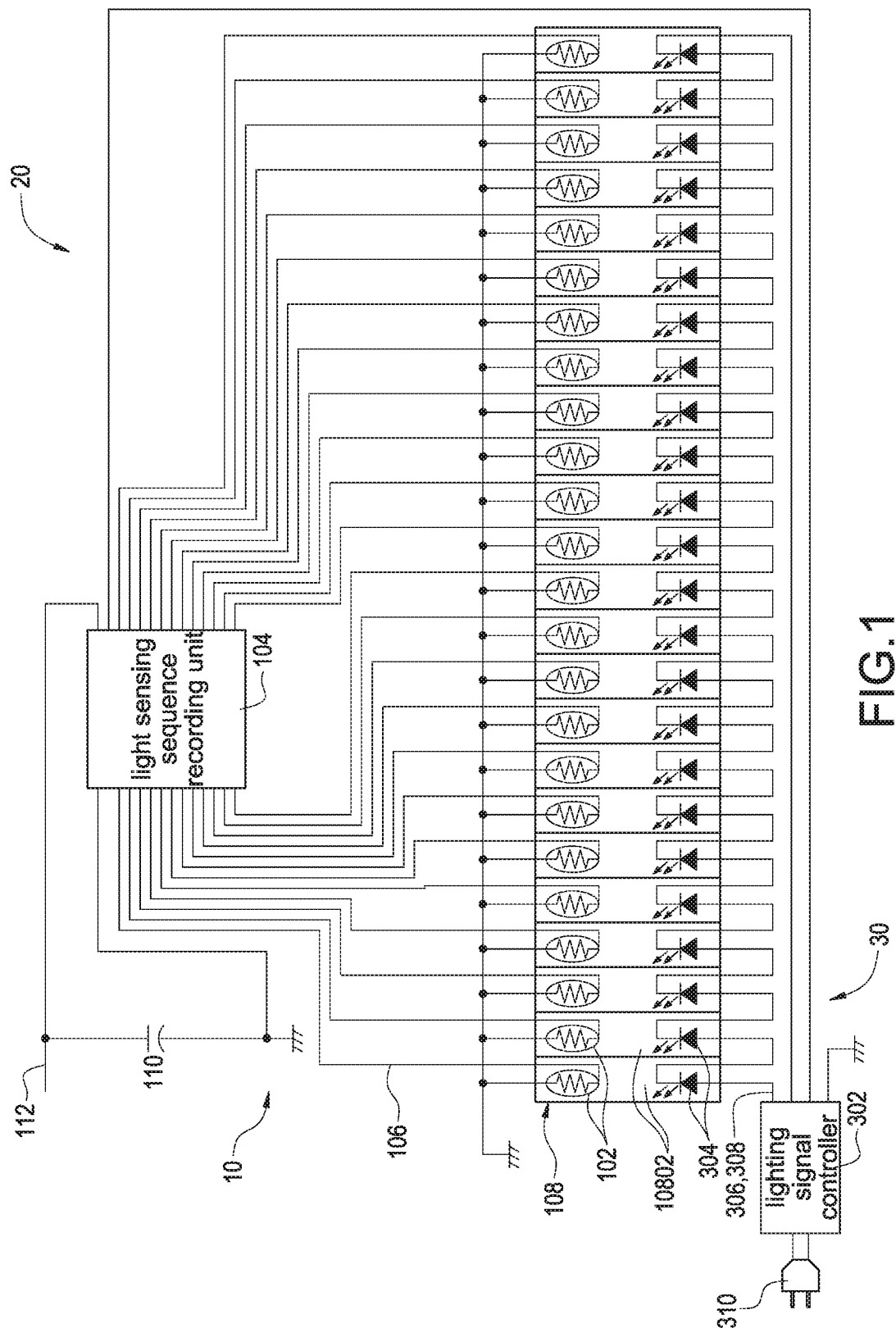
FIG. 1 shows a circuit diagram of an embodiment of the light sensing sequence recording apparatus and the smart light emitting diode lighting system of the present invention.

FIG. 1 shows a circuit diagram of an embodiment of the light sensing sequence recording apparatus and the smart light emitting diode lighting system of the present invention. A smart light emitting diode lighting system 20 comprises a light sensing sequence recording apparatus 10 and a light emitting diode lighting apparatus 30. The light sensing sequence recording apparatus 10 comprises a plurality of light sensing components 102, a light sensing sequence recording unit 104, a detection box 108 and a filtering capacitor 110. The light emitting diode lighting apparatus 30 comprises a lighting signal controller 302, a plurality of light emitting diode unit 304 and a power plug 310.

The light emitting diode lighting apparatus 30 is electrically connected to the light sensing sequence recording apparatus 10. The light sensing sequence recording unit 104 is electrically connected to the light sensing components 102. The filtering capacitor 110 is electrically connected to the light sensing sequence recording unit 104. The lighting signal controller 302 is electrically connected to the light sensing sequence recording unit 104. The light emitting diode units 304 are electrically connected to the lighting signal controller 302. The light emitting diode units 304 are electrically connected to each other in series. The light sensing sequence recording unit 104 receives a driving voltage 112 (for example, 5 volts direct current voltages). The lighting signal controller 302 is electrically connected to the power plug 310 to receive power through the power plug 310.

Figure 3:
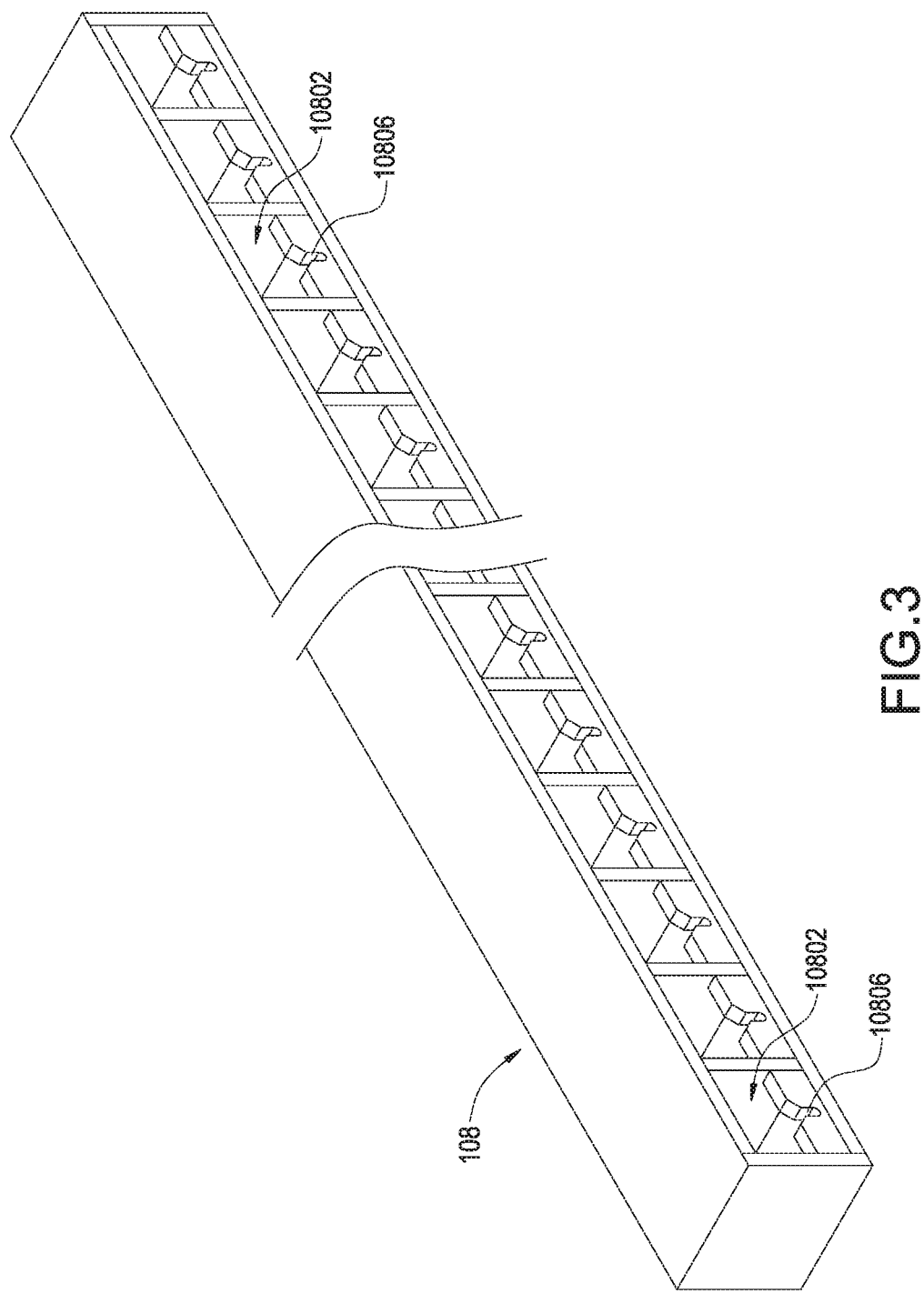
FIG. 3 shows a front view of an embodiment of the detection box of the present invention.
Figure 4:
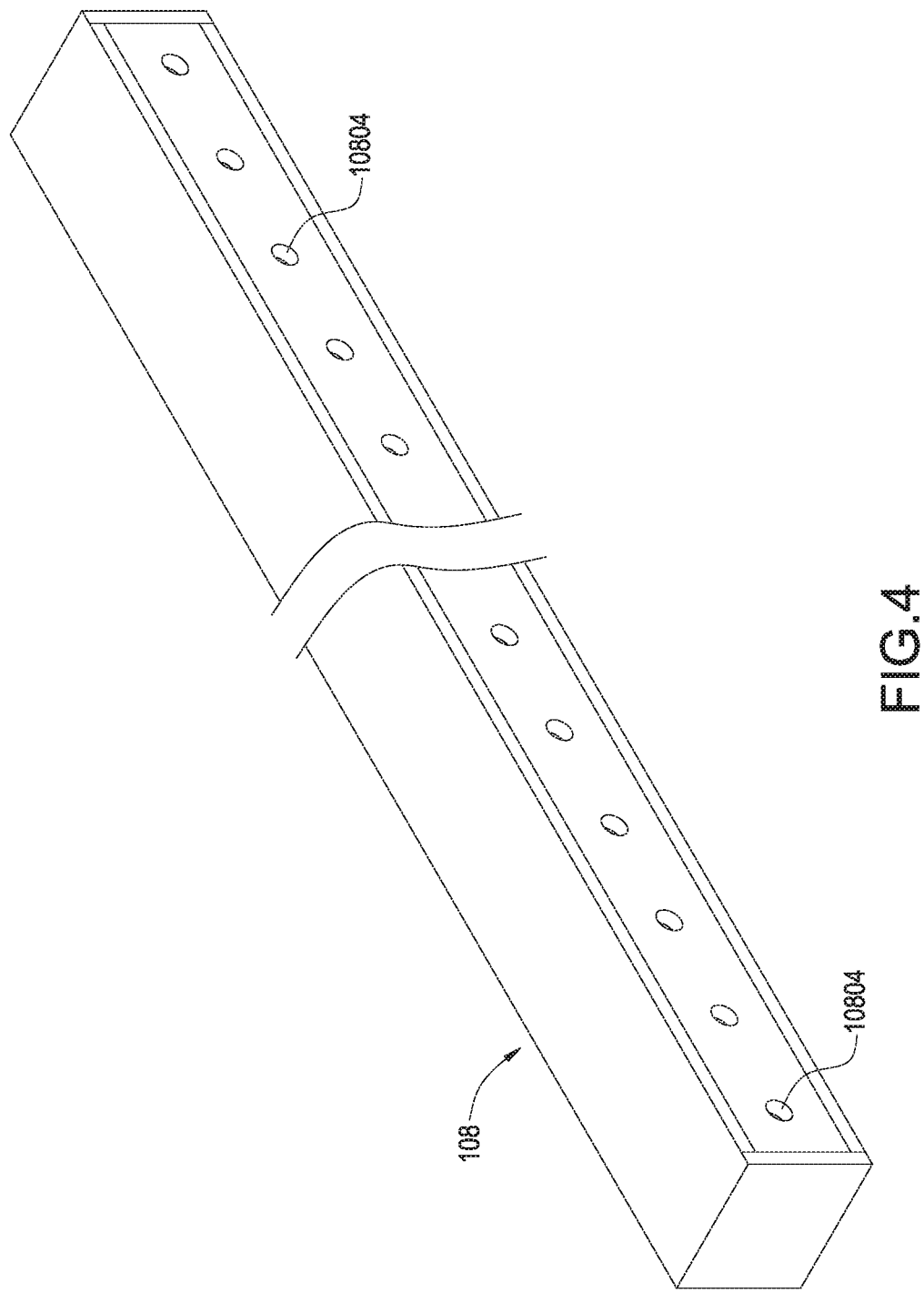
FIG. 4 shows a back view of an embodiment of the detection box of the present invention.

FIG. 3 shows a front view of an embodiment of the detection box of the present invention. FIG. 4 shows a back view of an embodiment of the detection box of the present invention. Please refer to FIG. 1 at the same time.

The detection box 108 is divided into a plurality of compartments 10802. Each of the compartments 10802 comprises a hole 10804 and an accommodation notch 10806. Namely, the hole 10804 and the accommodation notch 10806 are defined at/in the compartments 10802. The accommodation notch 10806 is arranged facing the hole 10804. A quantity of the compartments 10802 is equal to a quantity of the light sensing components 102. The quantity of the compartments 10802 is equal to a quantity of the light emitting diode units 304. Each of the light sensing components 102 is arranged at different one of the holes 10804. Each of the light emitting diode units 304 is arranged at different one of the accommodation notches 10806 of the compartments 10802, so that each of the light emitting diode units 304 faces different one of the light sensing components 102.

A material of the detection box 108 is a light tight dark acrylic, so that light emitted by each of the light emitting diode units 304 will be received by only the light sensing component 102 facing the light emitting diode unit 304, but light emitted by each of the light emitting diode units 304 will not be received by the other light sensing components 102 not facing the light emitting diode unit 304. The light sensing component 102 is a photo resistor, a CdS photo resistor, a photo diode or a photo transistor, so that by sensing variance of light, the light sensing component 102 generates a light sensing signal 106. In an embodiment, the light sensing sequence recording apparatus 10 and the light emitting diode lighting apparatus 30 are arranged in a dark room to avoid the influence of external light.

The action of the light sensing sequence recording apparatus 10 is simply described as following: Each of the light sensing components 102 sends the light sensing signal 106 to the light sensing sequence recording unit 104 respectively at different times. The light sensing sequence recording unit 104 records a light sensing sequence that the light sensing sequence recording unit 104 receives the light sensing signals 106 sent by each of the light sensing components 102 respectively.

The action of the light sensing sequence recording apparatus 10 and the light emitting diode lighting apparatus 30 is described as following: The lighting signal controller 302 sends a plurality of lighting signals 306 to the light emitting diode units 304 sequentially at different times. The lighting signal controller 302 sequentially records specific address codes of the lighting signals 306 sent to the light emitting diode units 304 to obtain a sending sequence. If an address code of the light emitting diode unit 304 is the same with (namely, matches with) the specific address code of the lighting signal 306, the light emitting diode unit 304 is driven by the lighting signal 306 to light, so that the light sensing component 102 facing the light emitting diode unit 304 senses light emitted by the light emitting diode unit 304 and sends the light sensing signal 106 to the light sensing sequence recording unit 104. The light sensing sequence recording unit 104 records the light sensing sequence that the light sensing sequence recording unit 104 receives the light sensing signals 106 sent by each of the light sensing components 102 respectively, and then the light sensing sequence recording unit 104 informs the lighting signal controller 302 of the light sensing sequence. By looking up (namely, comparing to, checking with or identifying with) the light sensing sequence, the lighting signal controller 302 adjusts a lighting sequence of a lighting command 308 sent to the light emitting diode units 304.

Following embodiment describes the action of the light sensing sequence recording apparatus 10 and the light emitting diode lighting apparatus 30 mentioned above:

To simplify the description, only five light emitting diode units 304 are mentioned in this embodiment. The light emitting diode unit 304 having the address code 01 is arranged at the second location of the light emitting diode units, and the light emitting diode unit 304 having the address code 02 is arranged at the first location of the light emitting diode units 304. The other light emitting diode units 304 having the address codes 03, 04 and 05 are arranged at the third, fourth and fifth location of the light emitting diode units sequentially. The light emitting diode unit 304 arranged at the first location of the light emitting diode units 304 (namely, the light emitting diode unit 304 having the address code 02) is arranged in the first of the compartments 10802 from left to right in FIG. 3. The light emitting diode unit 304 arranged at the second location of the light emitting diode units 304 (namely, the light emitting diode unit 304 having the address code 01) is arranged in the second of the compartments 10802 from left to right in FIG. 3, and so on.

The lighting signal controller 302 sends the lighting signals 306 having the specific address codes 01, 02, 03, 04 and 05 to the light emitting diode units 304 sequentially at different times. The lighting signal controller 302 obtains the sending sequence as 01, 02, 03, 04 and 05. Namely, the lighting signal controller 302 firstly sends the lighting signal 306 having the specific address code 01 to the light emitting diode units 304, and then the lighting signal controller 302 sends the lighting signal 306 having the specific address code 02 to the light emitting diode units 304, and so on.

When the light emitting diode unit 304 having the address code 01 receives the lighting signal 306 having the specific address code 01, the light emitting diode unit 304 having the address code 01 is driven by the lighting signal 306 having the specific address code 01, but the other light emitting diode units 304 receiving the lighting signal 306 having the specific address code 01 are not driven by the lighting signal 306 having the specific address code 01, so that the light sensing component 102 facing the light emitting diode unit 304 having the address code 01 senses light emitted by the light emitting diode unit 304 having the address code 01 and sends the light sensing signal 106 to the light sensing sequence recording unit 104. When the light emitting diode unit 304 having the address code 02 receives the lighting signal 306 having the specific address code 02, the light emitting diode unit 304 having the address code 02 is driven by the lighting signal 306 having the specific address code 02, but the other light emitting diode units 304 receiving the lighting signal 306 having the specific address code 02 are not driven by the lighting signal 306 having the specific address code 02, so that the light sensing component 102 facing the light emitting diode unit 304 having the address code 02 senses light emitted by the light emitting diode unit 304 having the address code 02 and sends the light sensing signal 106 to the light sensing sequence recording unit 104, and so on.

The light sensing sequence recording unit 104 records the light sensing sequence that the light sensing sequence recording unit 104 receives the light sensing signals 106 sent by each of the light sensing components 102 respectively (namely, the light sensing sequence is the second location, the first location, the third location, the fourth location and the fifth location), and then the light sensing sequence recording unit 104 informs the lighting signal controller 302 of the light sensing sequence. Now, according to the light sensing sequence, the lighting signal controller 302 is aware of the sequence that the light emitting diode units 304 are arranged in the compartments 10802. Namely, the lighting signal controller 302 is aware of the sequence and the location of each of the light emitting diode units 304.

Then, the connection between the light sensing sequence recording unit 104 and the lighting signal controller 302 is removed, and the light emitting diode units 304 are moved out from the compartments 10802. If the user wants the lighting sequence is: the fifth, fourth, third, second and first location of the light emitting diode units 304 are driven to light sequentially, the lighting command 308 will be designed by the user intuitively as: the lighting signal having the specific address code 05, 04, 03, 02 and 01 are sent out sequentially.

By comparing the light sensing sequence to the sending sequence, the lighting signal controller 302 adjusts the lighting sequence of the lighting command 308 sent to the light emitting diode units 304. Namely, the lighting signal controller 302 sends the lighting signals 306 having the specific address code 05, 04, 03, 01 and 02 sequentially to the light emitting diode units 304. Namely, the lighting signal controller 302 firstly sends the lighting signal 306 having the specific address code 05 to the light emitting diode units 304, and then the lighting signal controller 302 sends the lighting signal 306 having the specific address code 04 to the light emitting diode units 304, and then the lighting signal controller 302 sends the lighting signal 306 having the specific address code 03 to the light emitting diode units 304, and then the lighting signal controller 302 sends the lighting signal 306 having the specific address code 01 to the light emitting diode units 304, and then finally the lighting signal controller 302 sends the lighting signal 306 having the specific address code 02 to the light emitting diode units 304. Therefore, the fifth, fourth, third, second and first location of the light emitting diode units 304 are driven to light sequentially as the user's idea.

Figure 2:
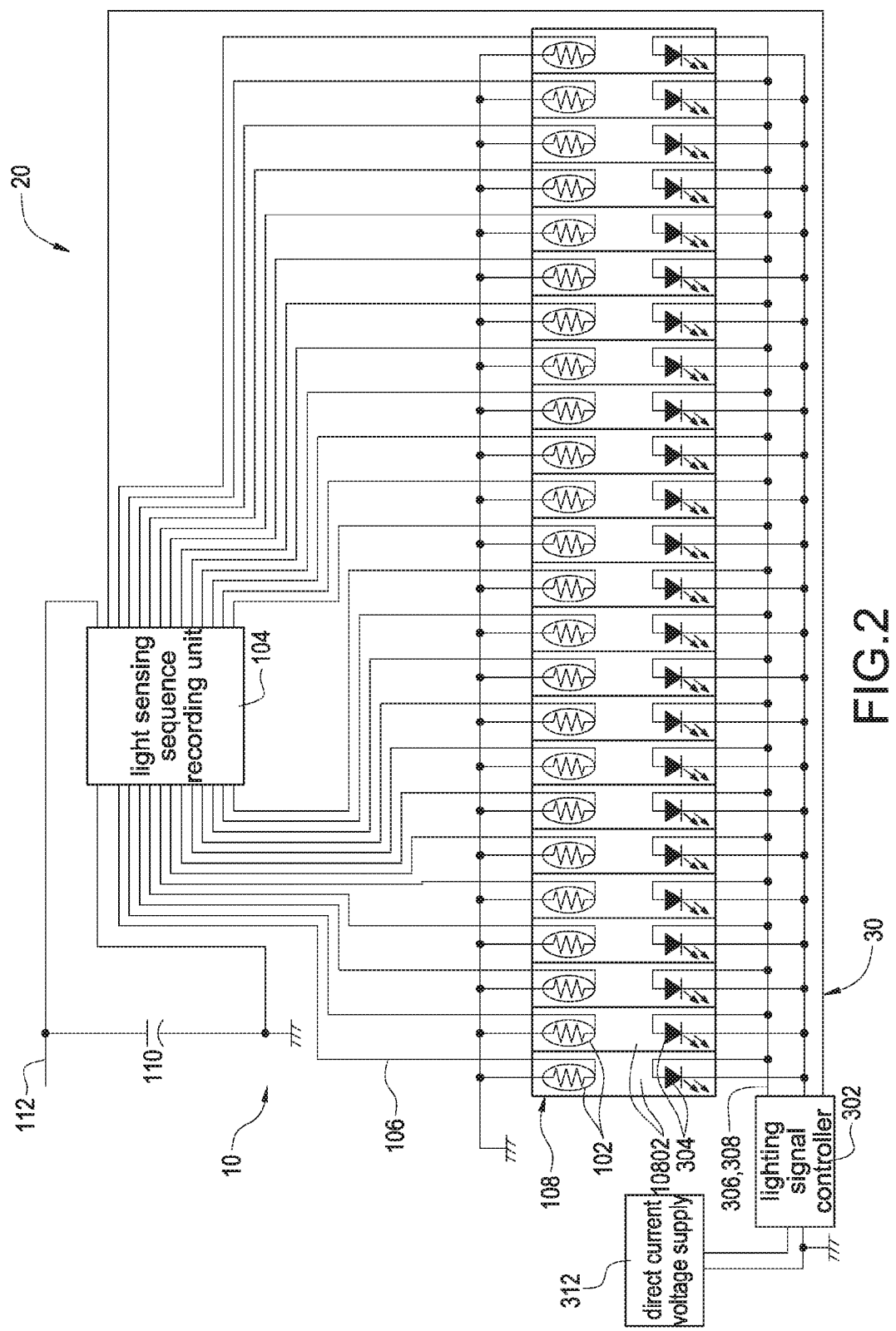
FIG. 2 shows a circuit diagram of another embodiment of the light sensing sequence recording apparatus and the smart light emitting diode lighting system of the present invention.

FIG. 2 shows a circuit diagram of another embodiment of the light sensing sequence recording apparatus and the smart light emitting diode lighting system of the present invention. The description for the elements shown in FIG. 2, which are similar to those shown in FIG. 1, FIG. 3 and FIG. 4, is not repeated here for brevity. Moreover, the lighting signal controller 302 is electrically connected to a direct current voltage supply 312 to receive power. The light emitting diode units 304 are connected to each other in parallel.

According to the present invention, the light emitting diode unit 304 can be arranged randomly and not following the sequence of the address codes. The advantage of the present invention is to simplify the manufacturing process of the sequence of arranging the light emitting diode units (of the light emitting diode lighting system) having the address codes.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light sensing sequence recording apparatus comprising:
   a plurality of light sensing components; and
   a light sensing sequence recording unit electrically connected to the light sensing components,
   wherein each of the light sensing components sends a light sensing signal to the light sensing sequence recording unit respectively at different times; the light sensing sequence recording unit records a light sensing sequence that the light sensing sequence recording unit receives the light sensing signals sent by each of the light sensing components respectively.

2. The light sensing sequence recording apparatus in claim 1 further comprising:
   a detection box,
   wherein the detection box is divided into a plurality of compartments; each of the compartments comprises a hole; each of the light sensing components is arranged at different one of the holes.

3. The light sensing sequence recording apparatus in claim 2, wherein each of the compartments further comprises an accommodation notch; the accommodation notch is arranged facing the hole.

4. The light sensing sequence recording apparatus in claim 3, wherein a material of the detection box is a light tight acrylic.

5. The light sensing sequence recording apparatus in claim 4, wherein the light sensing component is a photo resistor, a photo diode or a photo transistor.

6. A smart light emitting diode lighting system comprising:
- a light sensing sequence recording apparatus; and
- a light emitting diode lighting apparatus electrically connected to the light sensing sequence recording apparatus, wherein the light sensing sequence recording apparatus comprises:
- a plurality of light sensing components; and
- a light sensing sequence recording unit electrically connected to the light sensing components, wherein the light emitting diode lighting apparatus comprises:
- a lighting signal controller electrically connected to the light sensing sequence recording unit; and
- a plurality of light emitting diode units electrically connected to the lighting signal controller, wherein the lighting signal controller sends a plurality of lighting signals to the light emitting diode units sequentially at different times; if an address code of the light emitting diode unit is the same with a specific address code of the lighting signal, the light emitting diode unit is driven by the lighting signal to light, so that the light sensing component facing the light emitting diode unit senses light emitted by the light emitting diode unit and sends a light sensing signal to the light sensing sequence recording unit; the light sensing sequence recording unit records a light sensing sequence that the light sensing sequence recording unit receives the light sensing signals sent by each of the light sensing components respectively, and then the light sensing sequence recording unit informs the lighting signal controller of the light sensing sequence; by looking up the light sensing sequence, the lighting signal controller adjusts a lighting sequence of a lighting command sent to the light emitting diode units.

7. The smart light emitting diode lighting system in claim 6, wherein the light sensing sequence recording apparatus further comprises:
- a detection box,
- wherein the detection box is divided into a plurality of compartments; each of the compartments comprises a hole; each of the light sensing components is arranged at different one of the holes; each of the light emitting diode units is arranged in different one of the compartments, so that each of the light emitting diode units faces different one of the light sensing components.

8. The smart light emitting diode lighting system in claim 7, wherein each of the compartments further comprises an accommodation notch; the accommodation notch is arranged facing the hole; each of the light sensing components is arranged at different one of the accommodation notches, so that each of the light emitting diode units faces different one of the light sensing components.

9. The smart light emitting diode lighting system in claim 8, wherein a material of the detection box is a light tight acrylic; the light sensing component is a photo resistor, a photo diode or a photo transistor.

10. The smart light emitting diode lighting system in claim 9, wherein the light emitting diode units are connected to each other in series or in parallel.

* * * * *